United States Patent [19]

Grimm et al.

[11] Patent Number: 5,441,439
[45] Date of Patent: Aug. 15, 1995

[54] METHOD OF FINISHING A SURFACE OF A WORKPIECE

[75] Inventors: Hans Grimm, Esslingen; Walter Lang, Fellbach; Karl-Heinz Bergen, Filderstadt; Ernst Lang, Ostfildern; Ulrich Klink, Neuffen, all of Germany

[73] Assignee: Maschinenfabrik Gehring GmbH & Co., Ostfildern, Germany

[21] Appl. No.: 45,421

[22] Filed: Apr. 9, 1993

[30] Foreign Application Priority Data

Apr. 11, 1992 [EP] European Pat. Off. ............ 92106305

[51] Int. Cl.⁶ ................................................ B24B 1/00
[52] U.S. Cl. ........................................ 451/28; 451/54; 451/55
[58] Field of Search .................. 451/28, 36, 38, 54, 451/55, 57; 51/281 R, 281 P, 290, 318, 323, 326

[56] References Cited

U.S. PATENT DOCUMENTS

| 3,691,268 | 9/1972 | Burkley | 51/290 |
|---|---|---|---|
| 3,961,104 | 6/1976 | Tanner | 51/290 |
| 4,125,637 | 11/1978 | Tanner | 51/290 |
| 4,706,417 | 11/1987 | Gary | 51/290 |
| 4,980,996 | 1/1991 | Klink et al. | |

FOREIGN PATENT DOCUMENTS 299125 7/1916 Germany.
3932328 9/1989 Germany.

OTHER PUBLICATIONS

Patent Abstracts of Japan; vol. 12 No. 208 (M-709) (3055) JP 63012867(1).

*Primary Examiner*—Maurina T. Rachuba
*Attorney, Agent, or Firm*—Robert W. Becker & Assoc.

[57] ABSTRACT

A method for finishing surfaces of workpieces includes a honing process with at least two method steps. In one of the method steps the surface, for example, the inner wall of a bore, is honed to a predetermined final dimension whereby a very fine structure with minimal depth of honing traces is generated so that a great portion of the surface functions as the supporting surface. In a further method step, which can be performed before or after the finishing-honing step, crossed grooves are provided in the surface by subjecting the surface to a stream of a medium, especially a laser, whereby the pattern of the grooves provides a lubricant reservoir for the future use of the workpiece. The treatment with a stream of a medium does not cause deformations at the edges of the grooves. This ensures an optimal distribution of the lubricant.

28 Claims, 1 Drawing Sheet

METHOD OF FINISHING A SURFACE OF A WORKPIECE

BACKGROUND OF THE INVENTION

The present invention relates to a method for finishing a surface of a workpiece, especially inner walls of bores of an internal combustion engine, wherein a finished workpiece surface is produced that is highly resistant with respect to friction and temperature and wherein the workpiece surface during operation of the workpiece is provided with a lubricant.

For generating highly resistant surfaces, for example, of inner walls of bores which serve as the cylinder bore of piston engines, a honing technique with subsequent plateau-honing is known. In this method, a bore, which, for example has been premachined by fine-boring, is first honed to a desired dimension that is a little less (within a μm range) than the required final dimension. The honing step is provided to generate a bore with high shape exactness and dimension precision and a minimal roughness depth. This operation is carried out in one or more honing steps, for example, by pre- and intermediate honing steps. During the subsequent operation of the workpiece which, for example, is comprised of cast iron, the crossed honing traces generated by the honing stones form a reservoir for the required lubricant. During the subsequent plateau-honing step the final dimension of the workpiece is produced with a very fine cutting tool whereby only the tips of the already honed surface is removed. This method step increases the supporting surface portion of the bore for supporting the piston moved therein during operation of the workpiece.

It is also known to carry out the last method step by subjecting the workpiece to a stream of a medium, and it is known to use laser beams for this purpose (German Offenlegungsschrift 39 32 328). With a laser beam the tips of the honed surfaces are removed primarily by vaporization, and furthermore loosely attached particles and rough spots can be removed. The honing traces are maintained during this treatment.

Furthermore, a final treatment of finished honed bores are known in which with brushes and/or high pressure jets the so-called "sheet-metal shell", i.e., a metallic layer generated by bent tips which covers the graphite lamellas of the material of the workpiece, or rough spots are removed and the graphite lamellas of the workpiece material are substantially exposed (U.S. Pat. No. 4,980,996). With this treatment the honing traces which are important for the subsequent lubricant distribution remain also unchanged.

Because the cutting layer of the honing stones which are being used for honing are provided with irregularities depending on the material used for the honing stones, the formation of the honing traces with respect to width, depth, and distance to one another is random. Furthermore, by using these honing tools, which commonly have six to eight honing stones distributed over their circumference, deviations of the ideal circular form of the cross-sections over the length of the bore have been observed so that the bore may be somewhat constricted at some locations relative to the exact final dimension. In a subsequent method step more material is being removed at these locations than in other areas so that the supporting surface portion of the surface of the workpiece varies over the length of the bore whereby additionally fluctuations in the depth of the honing traces occur.

It is therefore an object of the present invention to carry out the finishing of the surface of a workpiece such that a lubricant reservoir with a uniform distribution of the lubricant can be attained. Furthermore, over the length of the bore a high proportion and a uniform distribution of supporting surface area is desired.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
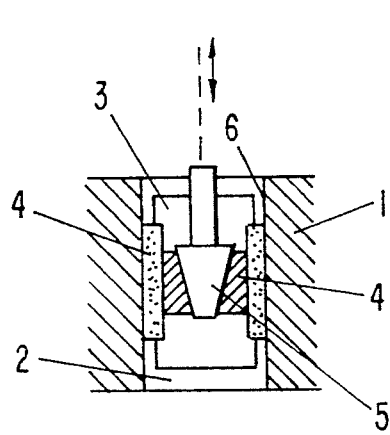
FIG. 1 shows a honing tool inserted into the bore of a workpiece.

The method of finishing a surface of a workpiece for producing a finished workpiece surface that is highly resistant with respect to friction and temperature according to the present invention is primarily characterized by the steps of:

Subjecting the surface of the workpiece to a stream of a medium; and

Generating grooves with the stream of a medium.

In a preferred embodiment of the present invention the method further comprising the step of honing the surface of the workpiece to a finished dimension so as to have a minimal roughness resulting from honing traces and a high supporting surface portion, with the grooves being deeper than the honing traces and substantially forming a reservoir for the lubricant. Preferably, the reservoir is exclusively formed by the grooves.

Expediently, the method further comprises the step of producing a pattern of the grooves which pattern is comprised of crossed grooves forming intersections, the grooves communicating with one another at the intersections. Preferably, an angle of intersection between the grooves of between 20° and 75° relative to a plane that is perpendicular to an axial direction of the surface of the workpiece is formed.

In a further embodiment of the present invention, the method further comprises the step of generating the grooves with an average width of 10 to 70 μm and a depth of 5 to 15 μm. Preferably, the grooves are provided with depressions distributed over a longitudinal extension of the grooves, the grooves having a total depth at the depression of between 25 and 50 μm. Advantageously, one depression is arranged per 0.1 mm to 1.0 mm of the longitudinal extension of the grooves.

Expediently, the method further comprises the step of providing the grooves with widened portions distributed over the longitudinal extension of the groove, the widened portions having a width of 30 to 100 μm. Preferably, the widened portions are positioned at the depressions. Preferably, the widened portions are arranged every 0.1 to 1.0 mm over the longitudinal extension of the groove and arranging one depression every 0.1 mm to 1.0 mm over this longitudinal extension. Preferably, the parallel grooves are spaced from one another at a distance of 0.1 to 1.0 mm. The distance between the parallel grooves can preferably be adjusted by controlling the stream of a medium.

Preferably, a laser beam, i.e., a stream of light, is employed as the stream of a medium. In the alternative, it is possible to employ a high pressure fluid jet, i.e., a stream of fluid, as the stream of a medium.

Expediently, the method further comprises the step of honing the surface of the workpiece to a finished dimension before the steps of subjecting the surface of the workpiece to the stream of a medium and generating the grooves.

In another preferred embodiment of the present invention, the method further comprises the steps of performing a plurality of honing processes for honing the surface of the workpiece to a finished dimension, and carrying out the steps of subjecting the surface of the workpiece to the stream of a medium and generating the grooves between two of the honing processes.

In another embodiment of the present invention, wherein the surface of the workpiece is an inner wall of a bore, the method further comprises the steps of: fine-boring the surface of the workpiece before carrying out the steps of subjecting the surface of the workpiece to the stream of a medium and generating the grooves; and subsequently fine-machining the surface of the workpiece in at least one honing process. Preferably, a pre-honing step is carried out before the fine-machining step.

Expediently, as a final step plateau-honing is carried out.

With the inventive method instead of the honing traces, generated by the honing stones in the surface of the workpiece, grooves are generated in a predetermined pattern by a stream of a medium, for example, in the form of a laser beam, for generating the required lubricant reservoir. With the inventive treatment of subjecting the surface of the workpiece to a stream of a medium grooves of a predetermined depth according to a defined pattern are generated, preferably, with evenly distributed intersections, whereby the material of the workpiece at the edges of the grooves is not beaded but otherwise deformed. This also avoids the "sheet-metal shell" commonly resulting from mechanical honing, i.e., bent tips which would partially cover the graphite lamellas of the material.

The method step of producing grooves by subjecting the surface to a stream of a medium can be incorporated into the sequence of finishing steps at any desired point. For example, when the surface of the workpiece is fine-honed after pre-honing the surface to the finished dimension so that the surface has a great supporting surface portion with minimal depth of honing traces, subsequently the grooves are generated by subjecting the surface to the stream of a medium.

This treatment of subjecting the surface to the stream of a medium can also be applied before the pre-honing step or, when a plurality of honing steps are performed, between two such honing steps or as a final method step. In this case a defined pattern of crossed grooves is generated which is dependent on the kinematic of the stream of a medium. In the future use of the workpiece this results in a uniform distribution of the lubricant that could not have been achieved with methods of the prior art.

DESCRIPTION OF PREFERRED EMBODIMENTS

The present invention will now be described in detail with the aid of several specific embodiments utilizing FIGS. 1 through 5.

FIG. 1 shows schematically a workpiece 1 with a bore 2 in axial section. A honing tool 3 provided with hones or honing stones 4 is inserted into the bore. For example, it is possible to distribute six or eight honing stones over the circumference of the honing tool 3. The honing stones are radially displaceable, as is conventional, for which purpose an axially adjustable rod with a cone 5 at its end is provided. The honing tool 3 is rotatably driven with an axial stroke in the direction of the double arrow, as is known per se, whereby the honing stones 4 machine the cylindrical inner walls 6 of the bore.

The inner wall 6 of the bore has been pre-honed whereby the depth of the roughness can be maintained at a lower level than previously possible. With the method steps explained infra in context with FIG. 1 the inner wall 6 of the bore is honed to the finished dimensions so that it has the predetermined final diameter and its cylindrical shape conforms to the predetermined tolerance values. Accordingly, in contrast to the conventionally honed bore walls, the basic structure of the surface of the workpiece does not have deep honing traces.

Figure 2:
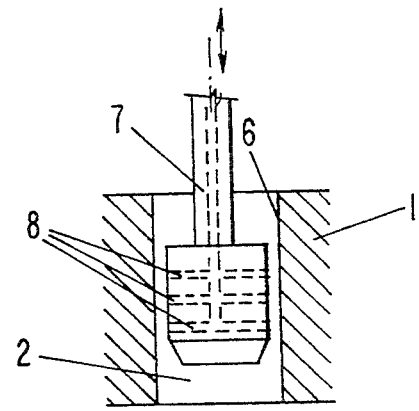
FIG. 2 shows a tool for ejecting a stream of a medium inserted into the bore.

FIG. 2 shows schematically the arrangement for performing the second method step. A treatment device 7 is positioned in the bore 2 which in the representation of FIG. 2 is indicated as a jet tool with nozzles 8 through which a fluid can be ejected at high pressure such that the fluid jets radially impact the inner wall of the bore 6. The jet tool is driven rotatably and with axial stroke as is known from the honing tool 3. The treatment device 7, however, preferably should be a laser which should be driven in the same manner, but may also be provided with a rotatable optical device so that it must only be axially inserted into the bore and removed from it in the axial direction.

Figure 3:
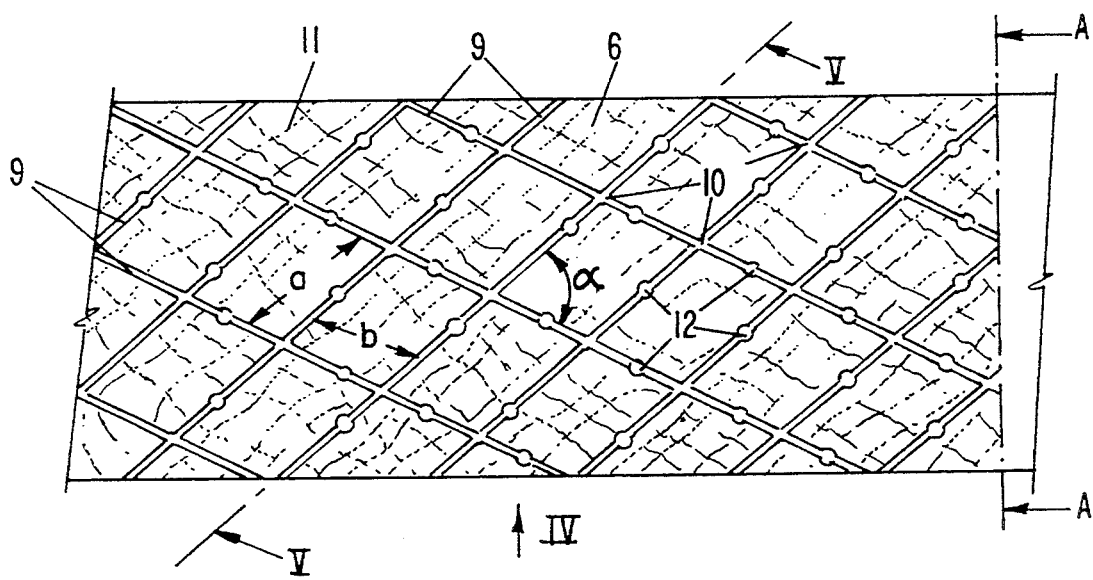
FIG. 3 is an enlarged detail of the bore surface in a developed projection.
Figure 4:
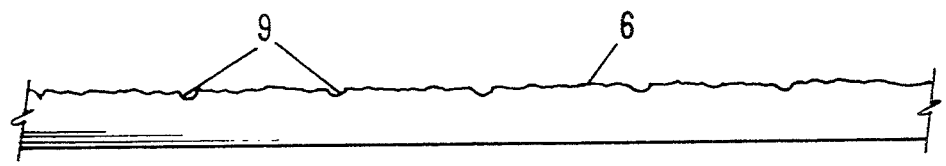
FIG. 4 is a view in the direction of arrow IV in FIG. 3.
Figure 5:
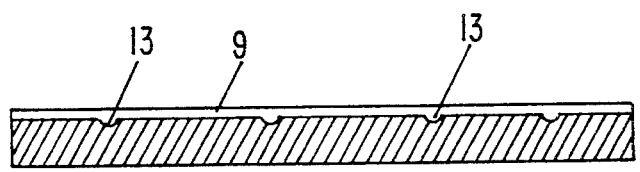
FIG. 5 is a section along the line V—V in FIG. 3.

With the device 7 the surface of the workpiece is provided with grooves 9, as can be seen schematically in FIGS. 3 to 5. FIG. 3 schematically shows a detail of a developed projection of the surface of the bore. The axis of the bore A is indicated as a dash-dotted line. The ratio of stroke and rotational velocity of the treatment device 7 is adjusted such that an intersecting angle of the grooves 9 of between 20° and 75° is achieved, in the shown example the angle is approximately 75°. At the intersections 10 the crossed grooves 9 communicate. Since during the treatment of the surface with a stream of a medium, especially in the contactless treatment with a laser, no beading or flattening of material, or rough spots are produced at the edges of the grooves, the intersections 10 are completely open so that an optimal distribution of the lubricant within the reservoir formed by the grooves is obtained.

The intensity and the width of the laser or high pressure jet stream and the stroke velocity of the device are selected such that the grooves 9 have a desired width and depth which is substantially greater than the roughness depth indicated by honing traces 11 in FIG. 3. The width of the groove 9 should be approximately 10 to 70 $\mu$m, and its depth should be approximately 5 to 15 $\mu$m.

At a plurality of locations of the grooves widened portions 12 and depressions 13 may be provided whereby the depressions preferably are arranged at the location of the widened portions. The distribution of the widened portions and depressions over the longitudinal extension of the grooves can be selected such that per mm of length one depression/widened portion or up to ten depressions/widened portions are present. (This is not represented to scale in FIG. 3). The grooves can be widened at the locations 12 to approximately 30 to 100 $\mu$m and the depressions may have a depth of approximately 25 to 50 $\mu$m.

The distance a, respectively, b between parallel extending grooves 9 should be between 0.1 mm and 1 mm whereby the distances a and b can be identical or, as represented in FIG. 3, different. For small distances it may be required to introduce the device 9 in a plurality of strokes through the bore 2. When using a laser it is possible to use a plurality of deflection mirrors in order to generate the small distances. For the treatment device 7 a control is provided, not represented in the drawings, with which the groove distances a and b can be adjusted.

The present invention is, of course, in no way restricted to the specific disclosure of the specification and drawings, but also encompasses any modifications within the scope of the appended claims.

What we claim is:

1. A method of finishing a surface of a workpiece for producing a finished workpiece surface that is highly resistant with respect to friction and temperature and has means for receiving a lubricant during operation of the workpiece, said method of finishing comprising a step of providing the workpiece surface with a minimal roughness and treating the workpiece surface with a laser beam for generating grooves, having a depth that is greater than the depth of said minimal roughness, for forming said means for receiving a lubricant.

2. A method according to claim 1, further comprising the step of:
honing the surface of the workpiece to a finished dimension so as to have a minimal roughness resulting from honing traces and a high supporting surface portion, with said grooves being deeper than the honing traces and substantially forming a reservoir for the lubricant.

3. A method according to claim 2, further comprising the step of forming the reservoir exclusively by said grooves.

4. A method according to claim 1, further comprising the step of producing a pattern of said grooves which pattern is comprised of crossed grooves forming intersections, said grooves communicating with one another at said intersections.

5. A method according to claim 4, further comprising the step of forming an angle of intersection between said grooves of between 20° and 75° relative to a plane that is perpendicular to an axial direction of the surface of the workpiece.

6. A method according to claim 1, further comprising the step of generating said grooves with an average width of 10 $\mu$m to 70 $\mu$m and a depth of 5 $\mu$m to 15 $\mu$m.

7. A method according to claim 1, further comprising the step of providing said grooves with depressions distributed over a longitudinal extension of said grooves.

8. A method according to claim 7, further comprising the step of arranging one said depression per 0.1 mm to 1.0 mm of said longitudinal extension.

9. A method according to claim 7, further comprising the step of providing said grooves with widened portions distributed over said longitudinal extension.

10. A method according to claim 9, further comprising the step of positioning said widened portions at said depressions.

11. A method according to claim 9, further comprising the step of arranging one said widened portion per 0.1 mm to 1.0 mm of said longitudinal extension.

12. A method according to claim 11, further comprising the step of arranging one said depression every 0.1 mm to 1.0 mm over said longitudinal extension.

13. A method according to claim 1, further comprising the step of spacing parallel ones of said grooves at a distance of 0.1 mm to 1.0 mm.

14. A method according to claim 13, further comprising the step of adjusting the distance between said parallel grooves by controlling the laser beam.

15. A method according to claim 1, further comprising the step of honing the surface of the workpiece to a finished dimension before the step of treating the workpiece surface with a laser beam.

16. A method according to claim 1, further comprising the steps of:
performing a plurality of honing processes for honing the surface of the workpiece to a finished dimension; and
carrying out the step of treating the workpiece surface with the laser beam between two said honing processes.

17. A method according to claim 1, wherein the surface of the workpiece is an inner wall of a bore, further comprising the steps of:
fine-boring the surface of the workpiece before carrying out the step of treating the workpiece surface with the laser beam; and
subsequently fine-machining the surface of the workpiece in at least one honing process.

18. A method according to claim 17, further comprising the step of pre-honing before the fine-machining step.

19. A method according to claim 1, further comprising the step of plateau-honing as a final step.

20. A method according to claim 16, further comprising the step of:
honing the surface of the workpiece to a finished dimension so as to have a minimal roughness resulting from honing traces and a high supporting surface portion, with said grooves being deeper than the honing traces and substantially forming a reservoir for the lubricant.

21. A method according to claim 20, further comprising the step of forming the reservoir exclusively by said grooves.

22. A method according to claim 17, further comprising the step of:
honing the surface of the workpiece to a finished dimension so as to have a minimal roughness resulting from honing traces and a high supporting surface portion, with said grooves being deeper than the honing traces and substantially forming a reservoir for the lubricant.

23. A method according to claim 22, further comprising the step of forming the reservoir exclusively by said grooves.

24. A method according to claim 7, wherein said grooves have a total depth at said depressions of between 25 $\mu$m and 50 $\mu$m.

25. A method according to claim 9, wherein said widened portions have a width of 30 μm to 100 μm.

26. A method according to claim 1, further comprising the step of providing said grooves with widened portions distributed over a longitudinal extension of said grooves.

27. A method according to claim 26, wherein said widened portions have a width of 30 μm to 100 μm.

28. A method according to claim 26, further comprising the step of positioning said widened portions at said depressions.

* * * * *